UNITED STATES PATENT OFFICE 2,099,168

AZO DYESTUFFS

Max Albert Kunz, Mannheim, and Hans Krzikalla and Walter Limbacher, Ludwigshafen-on-the-Rhine, Germany, assignors to General Aniline Works, Inc., New York, N. Y., a corporation of Delaware No Drawing. Application April 6, 1934, Serial No. 719,404. In Germany April 13, 1933

3 Claims. (Cl. 260—38.5)

The present invention relates to new azo dyestuffs and a process of producing same.

We have found that valuable azo dyestuffs are obtained by coupling a diazotized halogenaminobenzene free from hydroxy groups with a compound corresponding to the formula

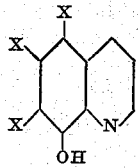

wherein one X represents hydrogen and the other X's hydrogen, halogen (preferably chlorine) or sulphonic acid, methyl, nitro or amino groups, the components being so selected that one sulphonic acid group is contained in the dyestuff molecule.

In the preparation of the dyestuffs the procedure may be for example that an 8-hydroxyquinoline free from sulphonic acid groups is coupled with a diazotized halogenaminobenzene sulphonic acid free from hydroxy groups, or that a sulphonic acid of 8-hydroxyquinoline, as for example 8-hydroxyquinoline-5-sulphonic acid, is coupled with a diazotized halogenaminobenzene free from hydroxy groups and sulphonic acid groups. For example diazotized 1-amino-3-chlorbenzene-6-sulphonic acid may be coupled with 8-hydroxyquinoline or 5- or 6-methyl-8-hydroxyquinoline, or diazotized 1-amino-2-chlorbenzene-5-sulphonic acid may be coupled with 5-chlor-8-hydroxyquinoline; on the other hand 6-methyl- 8 -hydroxyquinoline- 5 -sulphonic acid may be coupled with diazotized 1-amino-2,5-dichlorbenzene or 1-amino-3-chlorbenzene.

The dyestuffs thus obtainable yield, by aftertreatment of the dyeings on wool with bichromate or by dyeing on chrome-mordanted wool, very beautiful, usually orange, dyeings having excellent properties as regards fastness; the dyestuffs possess the special advantage of enabling the dyeing of wool from baths containing neutral chromium salts, i. e. according to the so-called single bath chroming process; hereby in the most cases especially valuable dyeings of good fastness properties are produced.

The following examples will further illustrate the nature of this invention but the invention is not restricted to these examples. The parts are by weight.

Example 1

20.7 parts of 1-amino-3-chlorbenzene-6-sulphonic acid are diazotized in the usual manner and the resulting solution of the diazo compound is allowed to flow into a solution of 15.9 parts of 8-hydroxyquinoline in hydrochloric acid. The coupling is carried out to completion by adding an excess of sodium acetate. A dyestuff is obtained which yields uniform orange shades on wool; by aftertreatment of the dyeing with bichromate or by dyeing on chrome-mordanted wool the shade of color is only changed slightly and very fast orange dyeings are obtained. The dyestuff also dyes wool orange shades very well from a bath containing neutral chromium salts—the so-called single bath process.

Dyestuffs of similar shades are obtained by employing 1 -amino- 2 -chlorbenzene- 5 -sulphonic acid, 1-amino-4-chlorbenzene-3-sulphonic acid or 1-amino-4-chlorbenzene-2-sulphonic acid instead of 1-amino-3-chlorbenzene-6-sulphonic acid or by employing 5-methyl-8-hydroxyquinoline or 5-chlor-8-hydroxyquinoline as coupling components.

Example 2

The diazo compound obtained from 24.1 parts of 1-amino-3,4-dichlorbenzene-6-sulphonic acid is coupled with 15.9 parts of 8-hydroxyquinoline in a solution rendered alkaline with sodium carbonate. The resulting dyestuff yields orange dyeings on wool which by aftertreatment with bichromate give very fast orange shades such as may also be obtained by dyeing on chrome-mordanted wool.

Example 3

The diazo compound prepared from 12.7 parts of 1-amino-3-chlorbenzene is coupled with 24.7 parts of 8-hydroxyquinoline-5-sulphonic acid in a solution rendered alkaline with sodium carbonate. The resulting dyestuff dyes wool yellow-red shades; by aftertreatment of the dyeing with bichromate or by dyeing on chrome-mordanted wool fast orange dyeings are obtained.

Example 4

16.1 parts of 1-amino-2,5-dichlorbenzene are diazotized in the usual manner and the resulting solution of the diazo compound is allowed to flow into a solution of 24.7 parts of 8-hydroxyquinoline-5-sulphonic acid which has been rendered alkaline with sodium carbonate. A dyestuff is obtained which yields yellow-red dyeings on wool which by aftertreatment with bichromate give fast orange dyeings. The same shade is obtained by dyeing on chrome-mordanted wool.

*Example 5*

14.1 parts of 1-methyl-2-chlor-4-aminobenzene are diazotized and coupled with 24.7 parts of 8-hydroxyquinoline-5-sulphonic acid in a solution rendered alkaline by means of sodium carbonate. The dyestuff obtained dyes wool yellow-red shades. By after-chroming such dyeings or by dyeing chrome-mordanted wool orange dyeings of very good fastness are obtained. Wool may also be dyed with the said dyestuff from a neutral bath containing chromium salts whereby orange shades are obtained.

What we claim is:—

1. Azo dyestuffs, corresponding to the general formula:

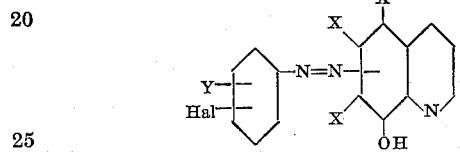

wherein the azo group is attached to one of the positions marked X, the remaining X's being selected from the group consisting of hydrogen, halogen, methyl, nitro, amino and SO₃H groups, and wherein Y is a member of the group consisting of hydrogen and SO₃H, the dyestuffs containing one SO₃H group in their molecule.

2. The azo dyestuff corresponding to the formula

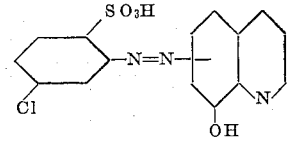

3. The azo dyestuff corresponding to the formula

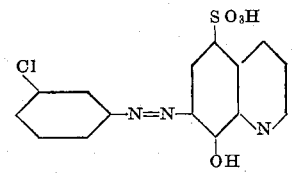

MAX ALBERT KUNZ.
HANS KRZIKALLA.
WALTER LIMBACHER.